Patented Mar. 18, 1947

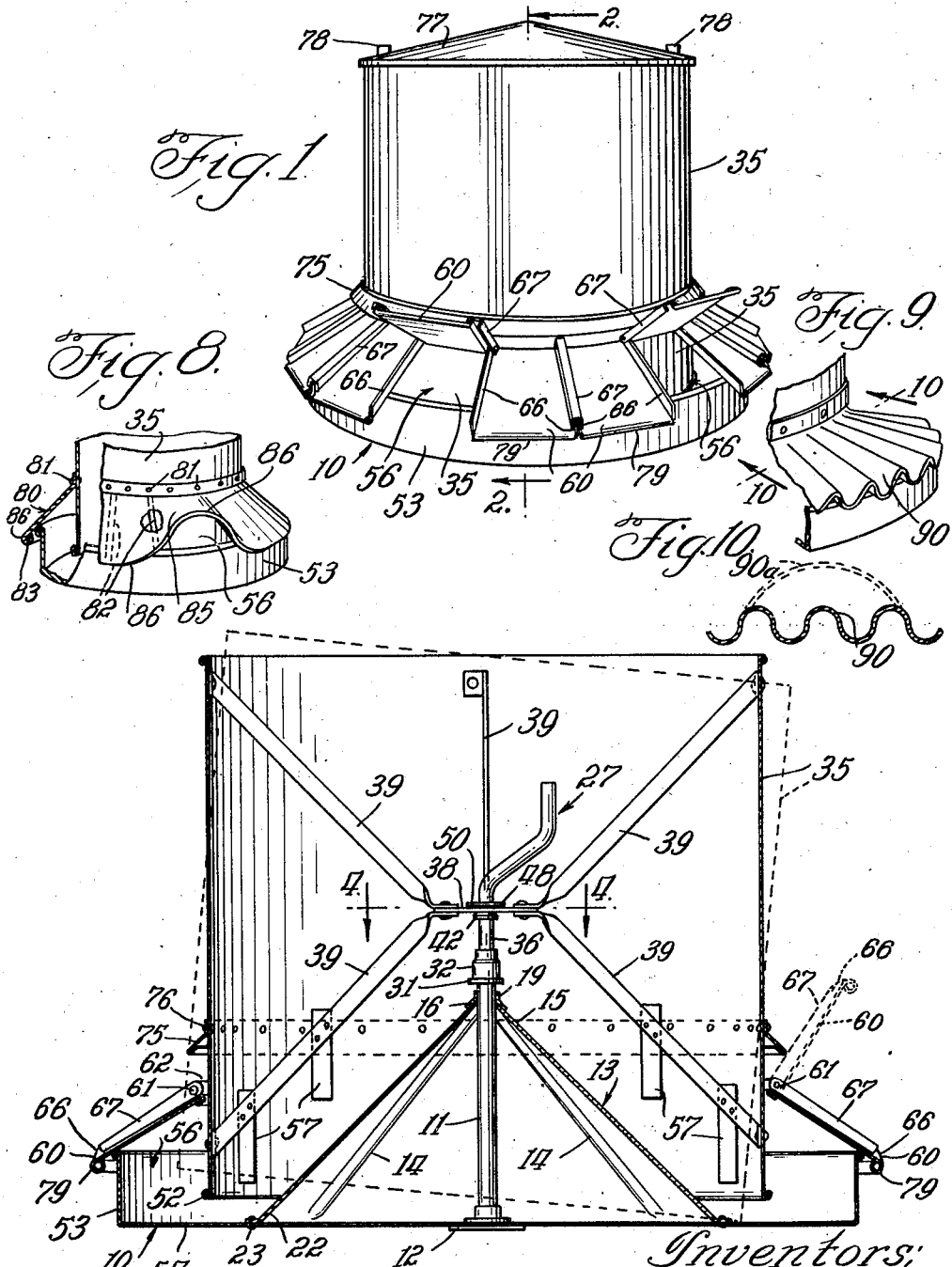

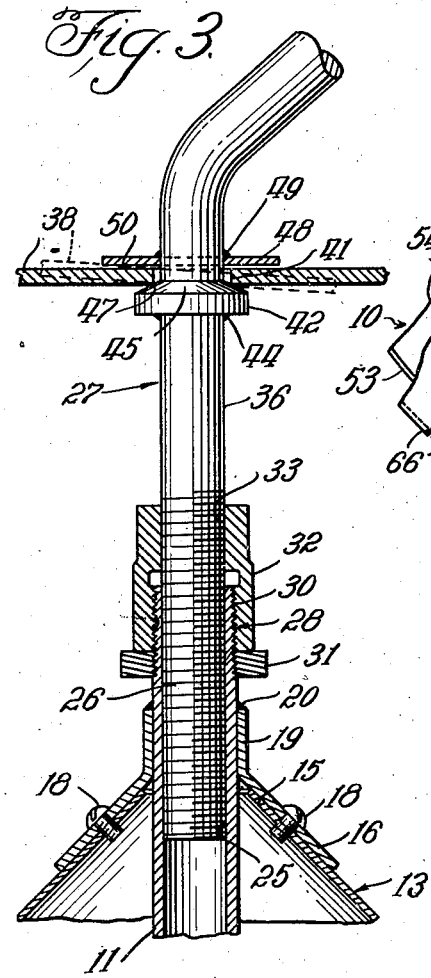
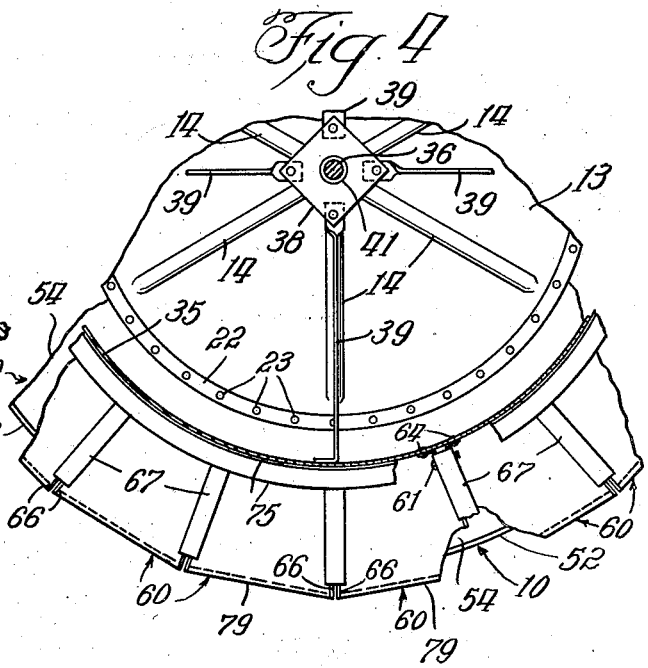
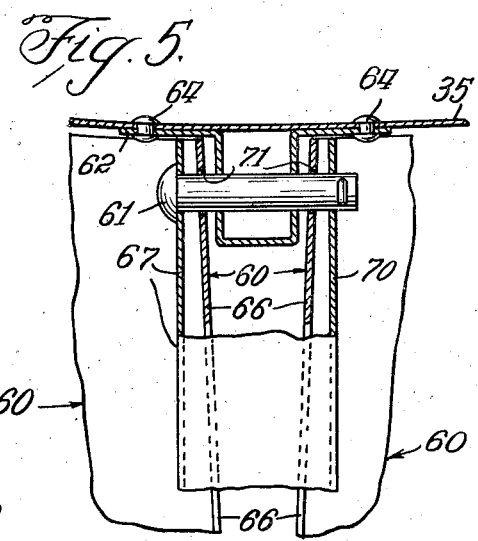
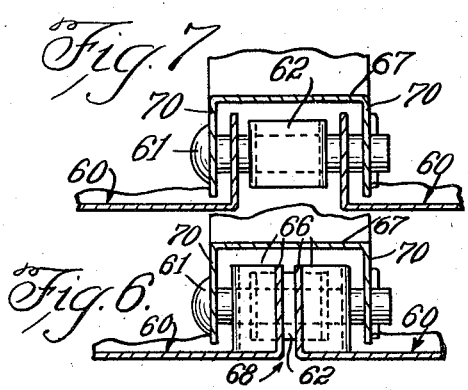

2,417,484

UNITED STATES PATENT OFFICE 2,417,484

STOCK FEEDING DEVICE

James T. Gifford, Elgin, and Paul O. Esmay, Elmhurst, Ill., assignors to Sears, Roebuck and Co., Chicago, Ill., a corporation of New York Application May 8, 1942, Serial No. 442,196

1 Claim. (Cl. 119—53.5)

This invention relates to stock feeding devices.

It is an object of our invention to provide a stock feeding device for animals such as hogs adapted to be agitated by a hog to deliver additional feed.

It is another object of the invention to provide a device of the character referred to enabling a considerable number of animals to feed simultaneously in a minimum space using a minimum of structural material.

Another object involves the provision of a stock feeding device which automatically closes upon withdrawal of the animal or animals therefrom.

An additional object resides in the provision of a stock feeding device in which caking of the feed during use of the device is prevented and breaking up of feed which has caked between uses of the device is effected, by the animal or animals when using the device.

It is another object of the invention to provide a device of this character which is readily adjustable without discomfort to the operator, to vary the rate of delivery of feed.

It is a further object to provide a device of this character which is substantially rain and dust-proof.

Further objects and advantages of the invention will appear as the description proceeds.

The invention will be better understood upon reference to the following description and the accompanying drawings, wherein:

Fig. 1 is a perspective view of a stock-agitating feeding device embodying features of the invention, with some of the doors or lids open and others closed.

Fig. 2 is an enlarged side sectional view taken as indicated by the line 2—2 in Fig. 1, with the cover removed.

Fig. 3 is an enlarged fragmentary sectional detail view of a portion of the adjusting mechanism appearing in Fig. 2.

Fig. 4 is a fragmentary sectional view taken as indicated by the line 4—4 in Fig. 2.

Fig. 5 is an enlarged fragmentary sectional view showing the hinge connection of two adjacent lids to the drum.

Fig. 6 is an enlarged fragmentary sectional view taken through one of the intervening rain shield flanges 67.

Fig. 7 is a view like Fig. 6 but with the lids in the same plane.

Fig. 8 is a fragmentary perspective view like Fig. 1 but with a modified trough cover.

Fig. 9 is a fragmentary perspective detail view of a further modified trough cover.

Fig. 10 is a sectional view taken as indicated by the line 10—10 in Fig. 9.

Referring now more particularly to the drawings, we have chosen by way of example to illustrate the invention in the form of a generally cylindrical structure, which is preferred because it provides for maximum storage capacity with minimum space requirements. The structure as illustrated comprises a pan 10 intended to rest on the ground, a standard 11 rigidly secured as at 12 centrally of the pan, and a conical or pyramid-like member 13 suitably reinforced as by flutes or channels 14 and relative to which the standard is substantially axially disposed, the upper or apex portion 15 of the member 13 being secured to the standard as by a frustoconical bushing 16 screwed as at 18, Fig. 3, to the portion 15 and having a sleeve 19 fitted about and welded as at 20 or otherwise suitably secured to the standard 11. The base 22 of the cone member 13 is riveted as at 23 or otherwise suitably fastened to the pan 10. The standard 11 terminates somewhat above the attaching member 16 and is internally threaded as at 25 to receive the threaded lower end 26 of an adjusting member 27. The upper end 28 of the standard 11 is externally threaded as at 30 to receive a nut 31, affording a locking means for a second nut 32 which is also threaded as at 33 to the adjusting member 27.

A drum 35, which may be in the form of substantially a right cylinder, is mounted to rest substantially coaxially with and about the lower portion 36 of the adjusting member 27. To this end, the drum is provided with a hub 38 held in place by spokes 39, the hub having a preferably central hole 41 through which said portion 36 extends, and a frusto-conical flange 42 is welded as at 44 or otherwise suitably secured to said portion 36, providing a seat 45 on which said hub rests, the seat being frusto-conical as shown or of spherical contour and engaging the bottom edge 47 of the hole 41 in said hub.

A second flange 48 is welded as at 49 or otherwise suitably secured to the portion 36 over the hub 38. Sufficient clearance is afforded at 50 between the hub 38 and flange 48, between the portion 36 and the hole 41, and between the lower end 52 of the drum and the spreader cone 13 and upstanding flange or wall 53 of the pan 10, and normally also from the bottom 54 of the pan, to enable said drum 35 to have limited substantially universal rocking or tilting movement as indicated by the dotted lines in Figs. 2 and 3 for a purpose which will later appear.

Feed is placed in the drum and is distributed outwardly by the cone 13, the feed being solid or semi-solid so that if the drum is not agitated the bottom of the feed will be disposed substantially at the bottom edge 52 of the drum. The adjustable handle 27 which extends at a height normally above the supply of feed in the drum regulates the height of the drum and hence causes the drum to act as a valve or gate regulating the space between the drum and the bottom 54 of the pan, thereby regulating the size of the passage through which the feed may flow to the trough 56 defined between the pan wall 53 and the drum, and hence the rate of flow of the feed to the trough according to the estimated rate of consumption by the hogs or other stock using the device. The drum may be tilted by the snout of the hog, causing the bottom of the opposite side of the drum to move away from the cone 13, and the paddles or blade-like agitators 57 carried by the lower spokes 39 to break up or "uncake" the feed, allowing increased flow of feed to the opposite side of the trough but correspondingly arresting the flow where the particular hog happens to be standing. The hog, finding no feed, will then release the drum, which will swing by gravity toward the hog, allowing feed to flow into the portion of the trough adjacent the hog, to be consumed by it. Or, the hog, without waiting, will likely wander where there is some feed in the trough or the farmer when replenishing the drum may agitate the drum to provide feed in the trough. As the feed is consumed by the hog his snout agitates the drum and thus feed is substantially continuously supplied to him.

Several hogs may feed simultaneously and, to that end, in accordance with one form of the invention, a series of doors or lids 60 may be provided, pivotally mounted as on pins 61 carried as by brackets 62 riveted as at 64 or otherwise suitably secured to the drum. The lids are preferably arranged side by side and have upstanding side flanges 66 receivable in channel rain shields 67, through all of which the pivot pins 61 extend. The lids and shields incline by gravity downward and outward substantially beyond the trough wall 53 to drain water away from the trough. The outer portions of adjacent flanges of course approach each other circumferentially as they approach the same (horizontal) plane, and recede from each other as they descend from such plane. Accordingly, the lids are arranged in such relation that when adjacent lids are either closed or fully open, the outer ends of their adjacent flanges 66 are preferably spaced apart as shown at 68 in Fig. 6, or in any event said ends do not bind each other. When the lids are in the same (horizontal) plane (Fig. 7), the outer ends of their adjacent flanges, while most remote, are spaced from or in any event do not bind against the flanges 70 of the rain shields 67. The pivot openings 71 in the lid flanges 66 are made oversize to afford clearance for the lost motion necessary in view of the fact that the pivot pins are not coaxial.

An awning or shield 75 which may be formed of strip steel or other waterproof material, riveted as at 76 or otherwise suitably connected to the drum 35, is arranged to shelter the inner ends of the lids from rain and to hold each lid in an unstable position when fully open to insure its closing when the hog retires. The awning, together with the rain shields 67, thus effectively keps rain, etc., out of the trough 56.

A conical cover 77 having suitable handle means as at 78 may be provided.

A rolled edge 79 may be provided on each lid as shown in Fig. 2 in order to assure a smooth edge or to perform as a catch which, when the lids are closed, is adapted to cover the top of the pan wall 53. This is true also when a hog is pushing the drum after lifting a lid, if another lid on his side is closed.

With this arrangement, moreover, the hog raises one lid or, at most, two lids, so that several hogs may feed at the same time, their agitation of the drum keeping the trough replenished, and the lids not in use being biased closed as by gravity to keep out fowl, dust and the like.

In accordance with another form of our invention, instead of the lids 60 and rain shields 67, we may employ a frusto-conical flexible umbrella-like hood or skirt 80 of leather or other suitable waterproof material (Fig. 8), anchored in any suitable manner as at 81 to the drum 35, and, when the material is relatively non-resilient or limp, resilience may be imparted to it as by spring stays 82 stitched or otherwise secured thereto and/or the skirt may be equipped with ballast 83 such for example as chain ballast used in portieres or such as a split or endless spring ring, capable of flexing readily to permit the hood to operate as described below. The hood normally rests on the top of the pan wall 53. A portion 85 of the hem or rim 86 of the hood is nudged up by the hog's snout to give the hog access to the trough 56, the remainder of the hood covering the trough to thereby protect it from the elements, vermin, etc. When the hog retires, the portion 85 of the hood drops to its trough covering position. The rim 86 may function like the rolled edges 79 of the lids 60. The hood may be of flat sheet material or, as shown at 90 (Figs. 9 and 10), could be corrugated or undulated along lines preferably substantially normal to its periphery, so as to reduce the opening 90a formed by the hog when raising a portion of the hood.

The drum, pan, spreading member and associated structure could be other than round if desired.

The drum, pan, cone, lid, rain shields, and other parts may be made of sheet or other metal, plastic, fiber or other composition or other suitable material. "Masonite" can be rolled into the form of a drum, for example.

Various modifications may suggest themselves to those skilled in the art without departing from the spirit of our invention, and hence we do not wish to be restricted to the specific form shown or uses mentioned, except to the extent indicated in the appended claim.

We claim:

In an animal feeder, an endless feed trough, and means for covering said trough, said means comprising waterproof lids side by side and having adjacent upstanding flanges, and a rain shield having a downwardly open channel dimensioned for receiving said flanges between the channel flanges and at all times resting on at least one of said lid flanges, said lids and shield being pivotally mounted at one side of said trough and normally inclined downwardly and outwardly beyond the other side of said trough to drain rain away from the trough and providing projecting edges on said lids to enable the hog's snout to raise each lid, the flanges of said adjacent lids being spaced apart by a substantial distance to prevent binding therebetween at different levels of said lids, a supporting bracket disposed in the space between said flanges and a common hinge pivot carried by said bracket and extending through the channel flanges and through the adjacent lid flanges,

JAMES T. GIFFORD.
PAUL O. ESMAY.

REFERENCES CITED

The following references are of record in the file of this patent:

UNITED STATES PATENTS

| Number | Name | Date |
|---|---|---|
| 1,344,789 | Burnett | June 29, 1920 |
| 1,350,523 | Royer | Aug. 24, 1920 |
| 2,273,616 | Beatty | Feb. 17, 1942 |
| 1,879,247 | Holliday | Sept. 27, 1932 |
| 1,772,843 | Rickey et al. | Aug. 12, 1930 |
| 2,226,476 | Maggart | Dec. 24, 1940 |
| 1,673,101 | Burnett | June 12, 1928 |

FOREIGN PATENTS

| Number | Country | Date |
|---|---|---|
| 390,962 | British | Apr. 20, 1933 |